United States Patent [19]
Smith, Jr.

[11] 3,909,684
[45] Sept. 30, 1975

[54] A-C POWERED, THYRISTOR-SWITCHED ELECTRIC MOTORS HAVING SUPERCONDUCTING FIELDS

[75] Inventor: Joseph L. Smith, Jr., Concord, Mass.

[73] Assignee: Massachusetts Institute of Technology, Cambridge, Mass.

[22] Filed: Mar. 22, 1974

[21] Appl. No.: 453,856

[52] U.S. Cl.................................. 318/138; 318/227
[51] Int. Cl.² ............................................ H02P 5/40
[58] Field of Search .......... 318/138, 171, 227, 230, 318/231; 310/10, 40, 52

[56] References Cited
UNITED STATES PATENTS

| | | | |
|---|---|---|---|
| 3,373,327 | 3/1968 | Teuber | 318/138 |
| 3,418,550 | 12/1968 | Kolatorowicz et al. | 318/138 |
| 3,619,746 | 11/1971 | Thornton et al. | 318/138 |
| 3,659,168 | 4/1972 | Salihi et al. | 318/227 |
| 3,681,676 | 8/1972 | Bourbeau | 318/227 X |
| 3,684,935 | 8/1972 | Sawyer et al. | 318/227 |
| 3,702,429 | 11/1972 | Sawyer et al. | 318/227 |

Primary Examiner—G. Z. Rubinson
Attorney, Agent, or Firm—Arthur A. Smith, Jr.; Robert Shaw; Martin M. Santa

[57] ABSTRACT

Electric motor using thyristor switches to allow connection to an a-c supply voltage. The thyristor switching is accomplished in part, by the use of a sensor which notes and uses relative positions of the magnetic fields of the armature and of the field to change the gate voltage applied to the thyristor and, in part, by the a-c system voltage that serves to bias the thyristor. Switching is timed to cause the armature magnetic axis to lead the field magnetic axis by about 90 electrical degrees, thereby providing a motor that operates from an a-c line yet exhibits the speed-control characteristics of a separately excited d-c motor. The concept disclosed in particularly useful in connection with superconducting machines that, because of size, are not ordinarily considered to be operable in the d-c mode.

18 Claims, 9 Drawing Figures.

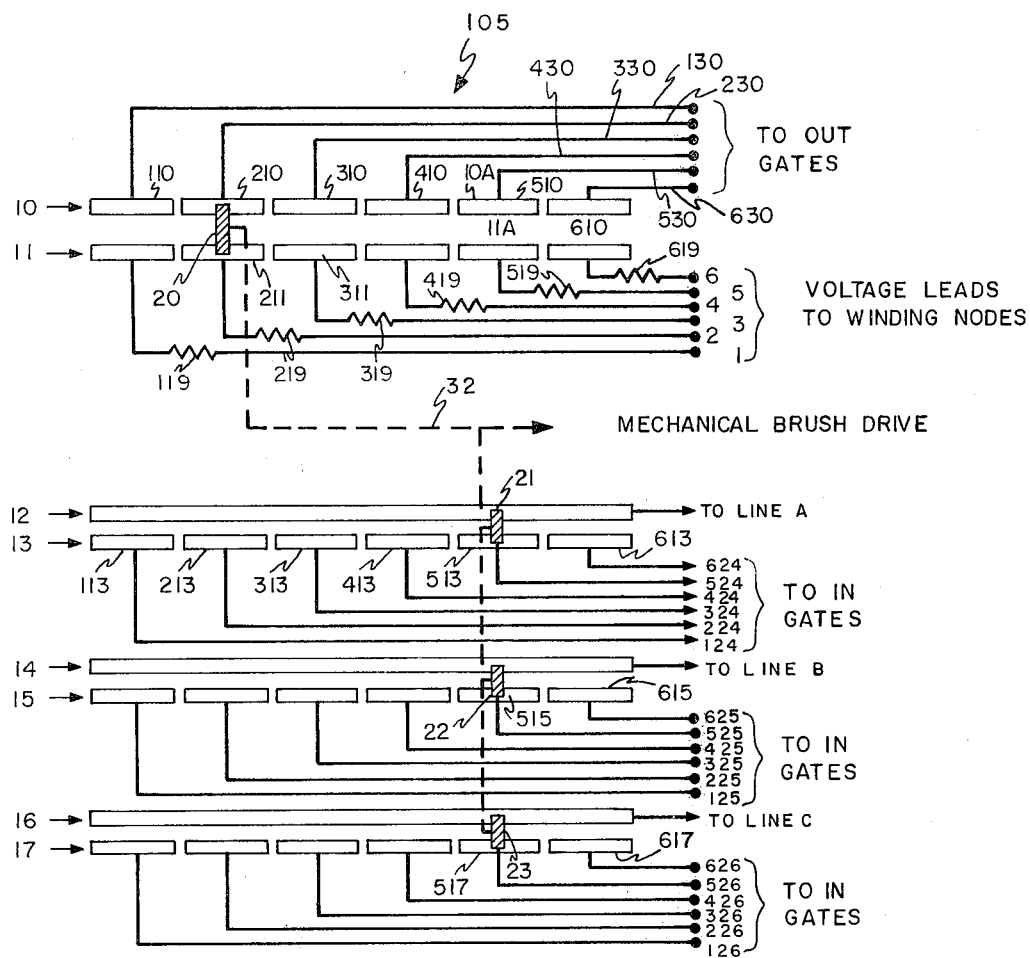
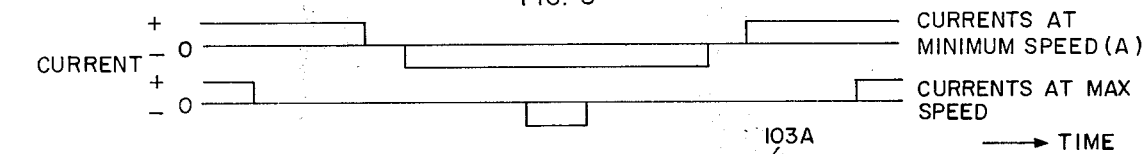
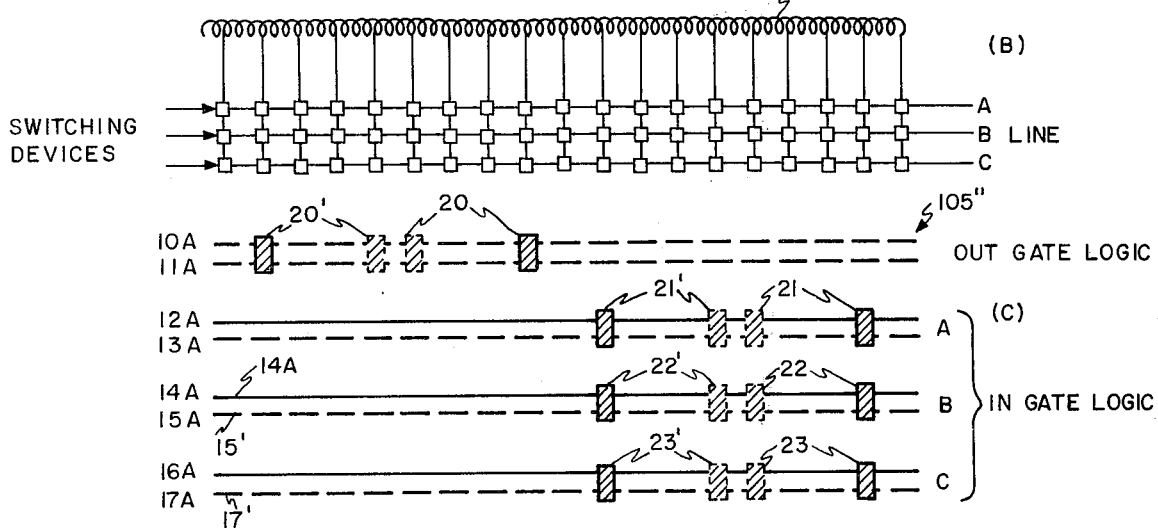
FIG. 7

A-C POWERED, THYRISTOR-SWITCHED ELECTRIC MOTORS HAVING SUPERCONDUCTING FIELDS

This invention was made in the course of a contract with the Office of Naval Research, an agency of the United States Government.

The present invention relates to electric machines wherein thyristor switching is employed to process electric current from an a-c power supply to the armature of the particular machine and, more particularly, to large superconducting machines and the like which operate from an a-c power supply yet exhibit the speed-control characteristics of a separately excited d-c motor.

Attention is called to the following United States patents and publications: Girault U.S. Pat. No. 1,673,673; Brouder et al U.S. Pat. No. 2,627,598; Shafranek et al U.S. Pat. No. 3,233,916; Cote U.S. Pat. No. 3,428,881; Grunwald et al U.S. Pat. No. 4,441,755; 3,441,755; Burnier et al U.S. Pat. No. 3,471,726; Rosenburg, Jr., U.S. Pat. No. 3,539,901; Lundelius, Sr. U.S. Pat. No. 3,586,935; Thornton et al, U.S. Pat. No. 3,619,472; Graham, U.S. Pat. No. 3,624,472; Grunwald et al, U.S. Pat. No. 3,440,456; a masters thesis entitled "Electronic Commutation for A Direct Current Machine" (Brown) deposited in the M.I.T. library system on Mar. 28, 1969; a journal article entitled "Electrical Machine in the Propulsion of High Speed Railway Vehicles" (Tustin) Bulletin of the International Railway Congress Association, January, 1968, P. 72 et seq.; a journal article entitled "High-frequency Motors for Electric Propulsion" (Thornton), Intersociety Energy Conversion Conference, 1968 Record,; and a paper entitled "State of the Art, Solid State AC and DC Motor Drives in Industry," (Kusko), Conference Record IEEE International Semiconductor Power Converter Conference, May 8 – 10, 1972.

Industry is at the threshold of employing superconducting machines. Such machines find use in the field of electric generation, but the smaller size per horsepower make them attractive in the electric motor field as well. Many uses for such motors, however, require some speed control such as is available, for example, in a mechanically commutated d-c machine. Such machine commutation is not possible in the very large superconducting machines. Further, a desirable feature of any such machines is the possibility of operating from an a-c power source. It is, accordingly, a principal object of the present invention to provide a superconducting machine that operates from an a-c line but exhibits the speed-control characteristics of a separately excited d-c motor.

A great deal of work has been done in relatively recent times in connection with systems that employ thyristor switching to control electric motors and the like; the complexity of the electronic circuitry varies from system to system and reliability and cost are somewhat related to that complexity. It is, accordingly, another object of the present invention to provide an improved thyristor switched electric motor.

A further object is to provide such a machine with reduced complexity in the electronic portion thereof.

A still further object is to provide a variable-speed electric motor that operates from a fixed-frequency a-c power source.

Another object is to provide a variable-speed electric motor whose speed can be controlled by changes in field current, like a d-c machine, or by mechanical position changes of biassignal brushes or by changing the magnitude of the a-c voltage.

These and still further objects are discussed in the specification that follows and are particularly delineated in the appended claims.

The objects of the invention are attained by an electric machine for use in an N-phase, polyphase electric power system and in which switching of electric current between the a-c power source and R armature coils of the machine is effected by thyristor devices which are controlled in part by zero crossings of the system's a-c current. The R armature coils of the motor are connected in a closed-loop configuration. An M-pole field is electromagnetically coupled to the armature and mechanically is movable relative thereto. Electric current to the armature coils is controlled by N-pairs of switching devices connected to each of R armature-winding nodes. One device of each pair carries current to the associated armature node and the other device of each pair carries current away from the associated armature node. Sensing means connects gate signals to the switching devices thereby to render the active and removes the gate signals to render them inactive in a predetermined logical sequence. The devices shown are thyristors and the preferred sensing means is a mechanical position indicator and logic device associated with the shaft of the machine. The devices and the sensing means act, in combination, to cause the armature magnetic axis to lead the field magnetic axis by about 90 electrical degrees.

The invention is hereinafter described with reference to the accompanying drawing in which:

FIG. 3 shows schematically a mechanical logic processor to control, in part, the switching means of FIG. 2, said switching means being preferably 18 thyristor pairs;

FIG. 7 shows a scheme for controlling the speed of the motor of FIGS. 1 and 2, for example, by position changes of brushes of a mechanical logic processor.

Figure 1:
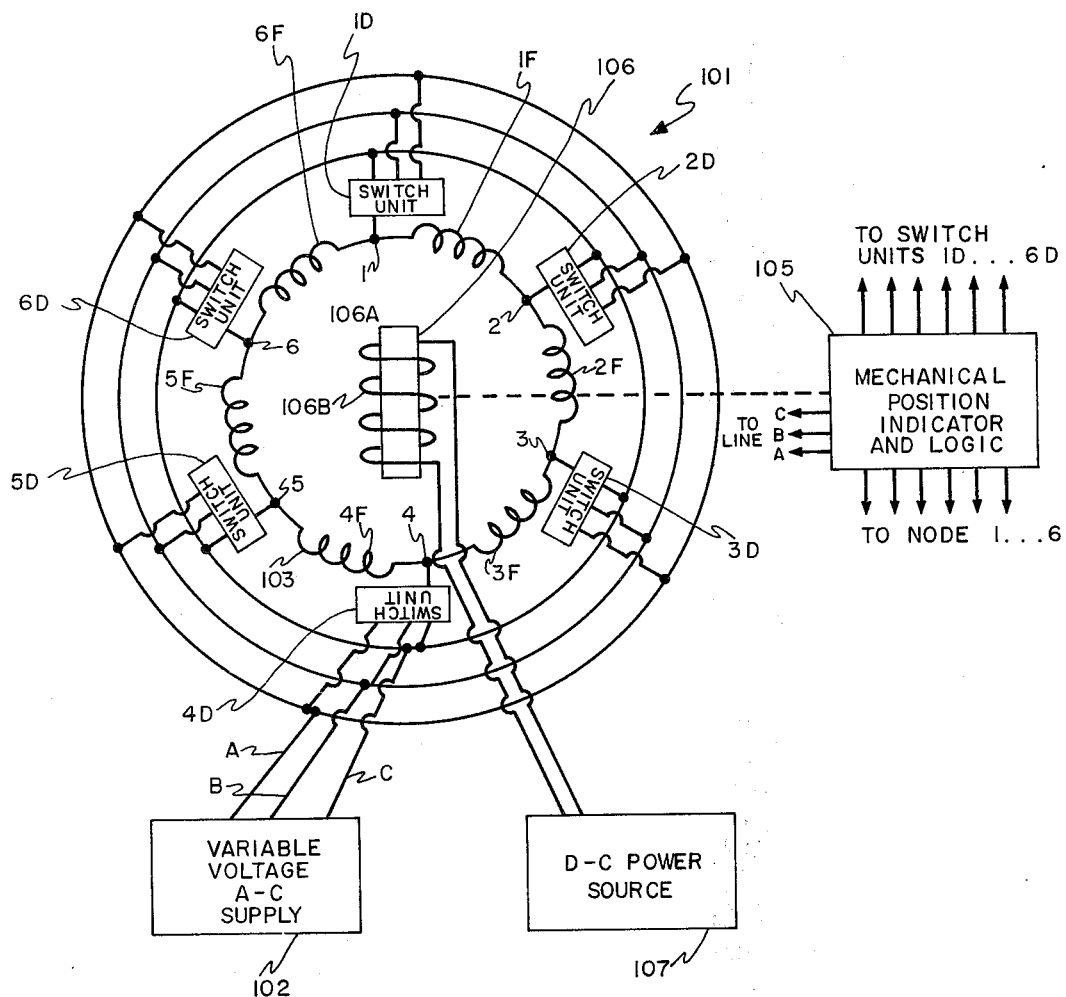
FIG. 1 is a schematic representation of a three-phase, electric or electronic motor consisting of a closed-loop armature winding with switching means comprising six switch units connected to carry current to and from the nodes of the winding, three thyristor pairs forming a switch unit for connection to each node as shown in FIGS. 4A and 4B.

Some brief preliminary remarks are in order. In general terms, the thyristor-switched motor hereinafter described consists of a rotating field winding inside a stationary armature. The armature is connected to an a-c line (most likely three-phase) through a bank of thyristors. The thyristor gates are connected in such a manner as to keep the armature magnetic axis about 90° ahead of the field-winding magnetic axis, resulting in maximum torque for any given armature flux and field flux. It is possible to do this with very simple mechanical switching of the gates, with high reliability. The result is a motor which operates from an a-c source yet exhibits the speedcontrol characteristics of a separately excited d-c motor.

In addition to the advantages of the speed control noted, the thyristor-switched motor offers the potential of extending the range of superconducting, low speed, a-c motors to lower power levels than are practical in synchronous machine designs operating at generator frequency. Proper pole pitch is needed to achieve high magnetic coupling in air-core, mulipole machines as is usually considered for superconducting apparatus. Thyristor switching makes it possible to design a machine for a given speed and frequency with fewer, larger poles than would be required for a synchronous machine operating at generator frequency. Thus the diameter of the motor may be reduced without sacrifice of magnetic coupling.

There follows now a short overall explanation of the invention with reference to FIGS. 1-4 which show a rotating electric machine 101. In order to simplify the present explanation, the machine 101 is a two-pole electric motor having an armature or armature-winding 103 (which is the stator) and a superconducting or salient-pole rotor or field 106, the salient-pole field being shown as having a magnetic core 106A and a field-winding 106B, the latter being energized by a d-c source 107. For superconducting machines, of course, the field comprises superconducting coils without a magnetic core. The armature-winding 103 consists of 6 coils IF...6F with nodes 1...6 between the respective coils, electric current being connected to and from the nodes 1...6 by thyristor switch units 1D...6D. The term "thyristor" denotes solid state devices which act like thyratron tubes and the term includes SCR's. A shaft-position-sensitive indicator or sensing means 105 is employed to trigger the thyristors in an appropriate sequence to keep the armature magnetic axis approximately 90 electrical degrees ahead of the field magnetic axis, in the manner discussed later herein. Locking of the angle between the armature magnetic axis and the field-winding magnetic axis provides a machine 101 whose control properties are like those of a separately excited d-c motor, that is, the speed is approximately inversely proportional to the current in the field-winding 106B at constant line voltage. The machine 101 can therefore be made variable in speed by field-current control. It will become evident in the explanation that follows that what has been done here is to provide a motor whose armature current is controlled by thyristors which in turn are controlled by a shaft-position-sensitive device which activates the thyristors as a function of shaft position, but in which the actual turning ON and OFF of the active thyristors is further a function of the instantaneous voltage appearing at the A, B, C phases of a variable-voltage, a-c supply 102 and the voltage at the nodes 1 to 6. The mechanical position indicator and control means 105, as will be quite evident, is a logic device as well as a position-sensitive device. A more detailed explanation is given hereinafter.

To simplify the explanations, a number of terms used should be defined. An "active" device (e.g., an active thyristor) is one that has a gate voltage such that it will conduct when forward biased, that is, an active switching device will conduct when a forward bias voltage occurs across the device and will cease to conduct when back biased and the current passes through zero. The bias voltage is determined by the relative voltages of the line and winding node connected to the device. When a switching device is switched from active to inactive while conducting, it will continue to conduct until the current goes through zero. It will then remain non-conducting. If switched to inactive while non-conducting, the device will remain nonconducting even with a forward bias voltage. Inactive devices remain non-conducting regardless of the voltage bias. When an inactive device is switched to active, it conducts on first appearance of forward bias voltage and then operates as described for an active device. The switching devices discussed herein, as noted, are thyristors, they are rendered active by applying appropriate signals to the gates of each, and they are rendered inactive by removing the gate signal. The thyristors are designated "in" and "out" to indicate that when conducting they deliver current to the associated armature node or away from that node, respectively. An armature code is "in-active" when current is delivered to it and thence to the armature-winding and such node is "out-active" when the current flow is from the armature to the node or thence through the thyristors to the line.

Figure 2:
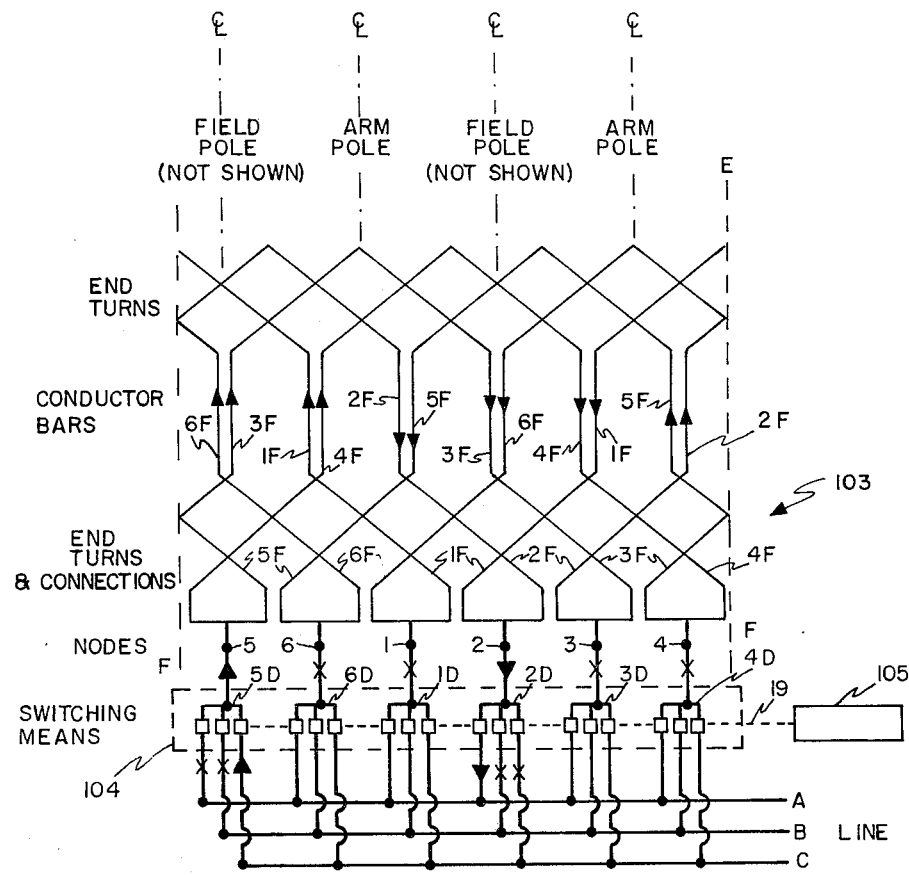
FiG. 2 is a schematic circuit diagram of the armature winding and switching means for a two-pole motor having an armature wave-winding of six, single-turn coils connected in a closed-loop with six armature nodes, switching means in the armature circuit, and a mechanical logic processor adapted to control, in part, the switching means.

In FIG. 2 the motor 101 of FIG. 1 is layed out linearly; the 90 electrical degree spread between the armature magnetic axis and the field magnetic axis is indicated. The coils 1F...6F are single turns to simplify the figure. In FIG. 2 the arrows in the various leads and coils represent current flow and an X in a line indicates no current flow. For example, current flows upward into the in-active node 5 from the switching unit 5D, the flow being in the right hand pair of thyristor pairs connected in an anti-parallel emitter-to-a base configuration which, with reference to FIG. 4A, indicates that the in-thyristor labeled 5C is conducting whereas in-thyristors 5A and 5B are active but non-conducting and out-thyristors 5A', 5B', and 5C' are not active and thus, nonconducting. There is, therefore, current flow into the in-active node 5 and out of the out-active node 2, nodes 1, 3, 4, and 6 have no current flow. By appropriate programming the node 5 is made in-active and the node 2 is made out-active at the time represented in FIGS. 2, 3, 4A, 4B and 4C. At a later time, node 6 is in-active and node 4 out-active. Thus the armature field rotates in the clockwise direction, FIG. 1. Reversing the programming sequence creates an armature field rotating in the counterclockwise direction. Programming of the thyristor cycle is now explained with reference to FIGS. 3 and 4C which show the mechanical logic device 105 in detail.

The logic device 105 comprises a first conductive segmented element 10 and an associated second conductive segmented element 11. In the present embodiment the conductive segmented elements are stationary, are annular or ring-shaped and closely, axially spaced. The gap between the elements 10 and 11 is bridged by a brush 20 which rotates with the motor shaft numbered 52 in FIG. 4C, as indicated by the dotted line shown at 32 in FIG. 3, which brush acts to carry gate signals from a node to an out-thyristor gate. The numerals 1...6 in FIG. 3 again represent the armature-winding nodes; the connection is from a node, through a segment of the second conductive segmented element 11, through the brush 20 to a segment of the first conductive segmented element 10 and thence along conductors 130...630 to the out gates of the switching units 1D...6D. By way of illustration, when the brush 20 bridges the gap between the segments designated 210 and 211, there is a conductive path from the node 2 to the segment 211 across the brush 20 to the segment 210 and thence along conductor 230 through current limiting networks 218A', 218B' and 218C', respectively, each consisting in this case of four resistors and a diode. The gates of the out-thyristors 2A', 2B' and 2C' are, at the instant of time represented in FIG. 4B, thereby connected to the node 2 and are out-active. The in-thyristors 2A, 2B and 2C in FIG. 4B have open gate circuits and are therefore not active. The conductive segments 10 and 11 are annular in form as is shown in FIG. 4C, and each pair of segments is contacted by the brush 20 as it rotates with the shaft 52. A similar explanation applies to the unit 5D in FIG. 4A except that unit 5D is in-active at the time shown. An attempt has been made to follow a numbering pattern for the leads; thus, the leads labeled 130, 230, etc. connect nodes to out gates, the lines labeled 124, 224, etc., 125, 225, etc., and 126, 226, etc., are connected to the gates of the inthyristors; also consistent numbering is followed in labeling the elements of the processor 105.

Gate signals to the in-thyristors that carry current in to the armature winding 103 are provided by the three sets of lower elements in FIG. 3 which shows a first set consisting of first solid conductor 12 and a third conductive segmented element 13, the gap between this associated pair being bridged by a brush 21. Again the conductor 12 and segmented element 13 are ring shaped like the members 10 and 11. This applies also to the second and third sets consisting of solid conductors numbered 14 and 16, respectively, and respective associated fourth and fifth conductive segmented elements 15 and 17, the gap between the elements 14 and 15 being bridged by a brush 22 and the gap between elements 16 and 17 being bridged by a brush 23. The solid rings 12, 14 and 16 are connected respectively to line phases A, B and C. Each of the segments in the segmented rings 13, 15 and 17 is connected to the gate of a single in-thyristor. The segments of the ring 13, i.e., 113...613, are connected respectively to the gates of the in-thyristors which switch current from line A into nodes 1...6. The segments of the rings 15 and 17 are connected respectively to the gates of the in-thyristors which switch current from line B and line C into nodes 1...6 of the winding. For example, segments 513, 515, and 517 are connected respectively by conductors 524, 525 and 526 to the in-gates of thyristors 5A, 5B and 5C in the switching unit 5D, FIG. 4A, through current limiting networks 518A, 518B, and 518C, respectively.

Each of the networks 518A, 518B, 518C, and the corresponding networks 518A', 518B' and 518C', is made up of four resistors and a diode. In addition, current limiting resistors 119, etc., are required between the respective segments of ring 1' and the corresponding winding nodes to prevent excessive currents when the brush 20 bridges adjacent segments, e.g., the segments 211 and 311.

Figure 4A:
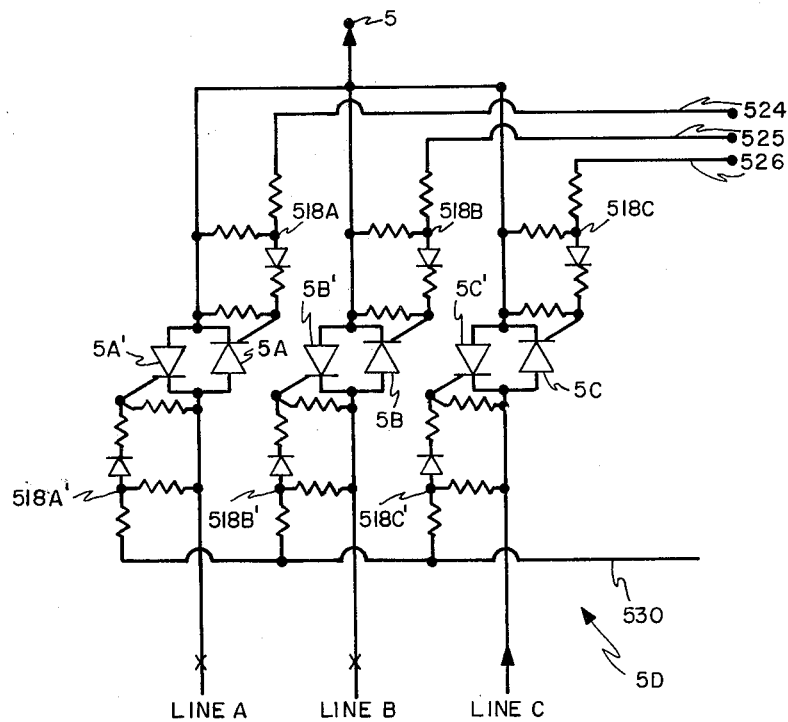
FIG. 4A shows schematically, a group of these thyristor pairs which constitute one unit of the switching means of FIGS. 1 and 2 as required for connection to each node of the armature winding.
Figure 4C:
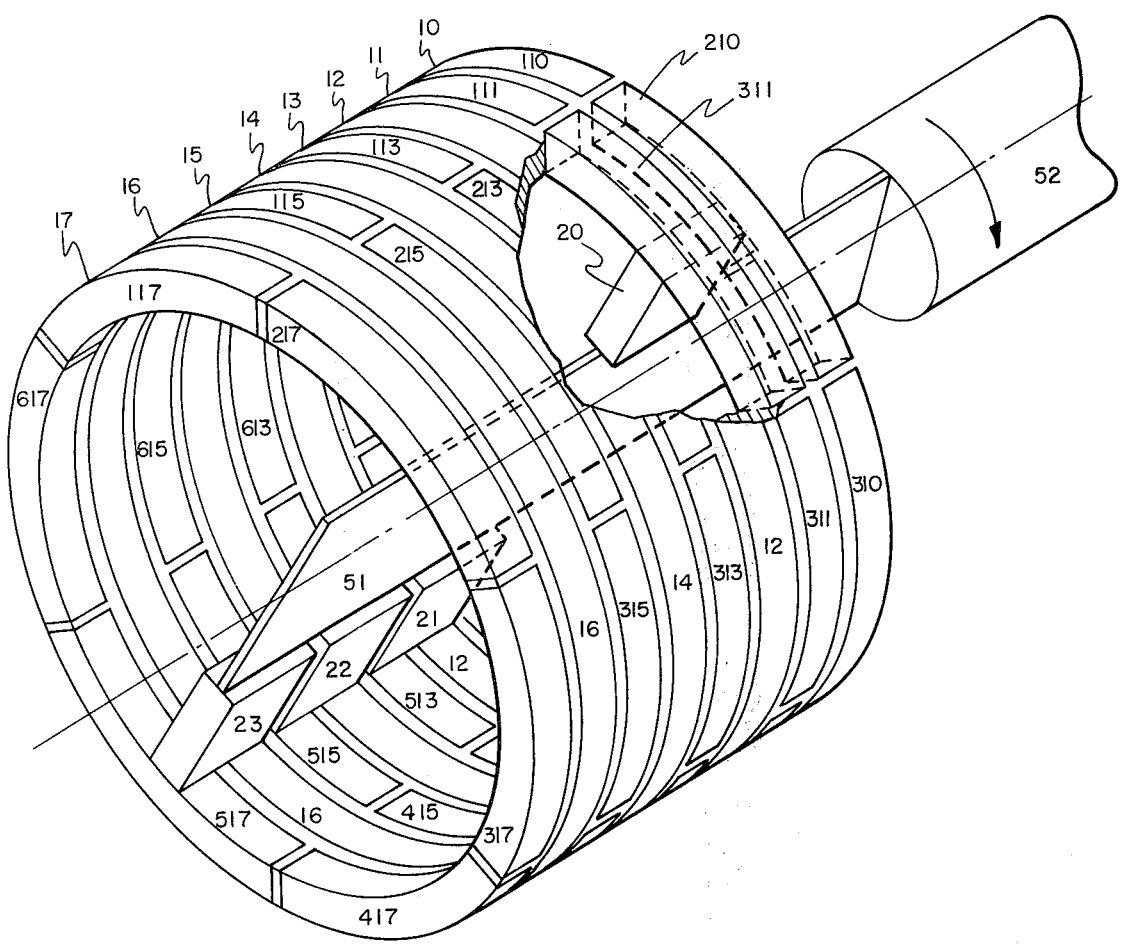
FIG. 4C is a isometric view, partly cutaway, of the mechanical logical processor shown in FIG. 3.

With the brushes 21, 22, and 23 in the position shown in FIG. 3, line A is connected to the gate of the in-thyristor 5A, FIG. 4A, through the ring 12, the brush 21, the segment 513, the conductor 524, and the network 518A. Line B is connected to the gate of the thyristor 5B, FIG. 4A, through the ring 14, the brush 22, the segment 515, the conductor 525 and the network 518B. Line C is connected to the gate of the thyristor 5C, FIG. 4A, through the ring 16, the brush 23, the segment 517, the conductor 526 and the network 518C. Thus the in-thyristors of the switching unit 5D are active and all other in-thyristors have open gate circuits and are, thus, not active.

At the instant of time represented in FIGS. 2, 3, 4A, 4B and 4C, six thyristors are active, three in-active and three outactive. For the short time that the brushes 20, 21, 22, and 23 connect the same set of rings and segments, these six thyristors act in the same manner as a full wave rectifier, with the current switching in response to changes in the a-c line voltage. At the instant shown, the thyristors 5C and 2A are conducting since at this time, the line C is most positive and the line A is most negative. A short time later line phase B will become more negative than line phase A; as a result the thyristor 2B' will receive a positive bias voltage and a positive gate signal and will start conducting. The gate signal is positive since the gate of the thyristor 2B' is connected to the node 2, rather than line B. Thyristor 2A' will receive a negative bias which will reduce the current to zero and the thyristor 2A' will cease to conduct. A short time later the in current will switch from the thyristor 5C to 5A as the line A becomes more positive than line C. The thyristor switching sequence caused by one cycle of the a-c line is: 2A' to 2B', 2B', 5C to 5A, 2B' to 2C', 5A to 5B, 2C' to 2A' and 5B to 5C.

Figure 4B:
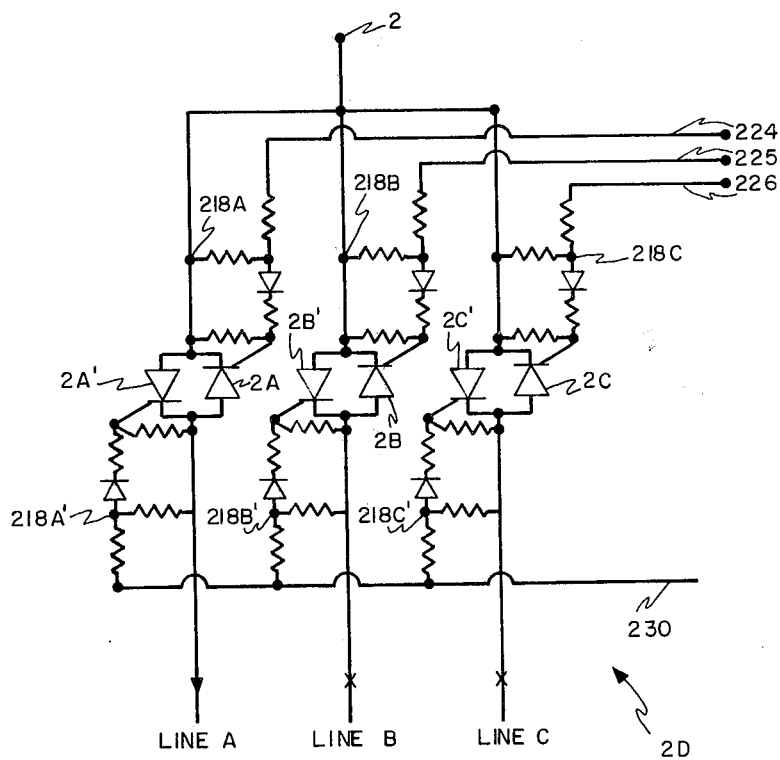
FIG. 4B is a schematic representation, similar to FIG. 4A, of another unit of the switching means but one that is connected 180 electrical degrees away from the unit of FIG. 4A.

In order to illustrate further the action as the rotor motion moves the brush 20 from segments 210 and 211 to segments 310 and 311, the brush 21 to segment 613, the brush 22 to segment 615 and the brush 23 to segment 617, consider that the brushes have just moved in FIG. 3 but the currents and voltages of FIG. 2 and FIGS. 4A and 4B have not yet changed. With the brushes moved, the switching devices 5D and 2D are inactive with all gate circuits open. The thyristors 5C and 2A' will however continue to conduct to the first current zero. When the voltage in phase A of the a-c line increases above the voltage of phase B, thyristor 3B' will receive a positive bias and a positive gate signal and will start to conduct current from the node 3. The self-inductance of the winding 2F prevents the current from switching from the thyristor 2A' to the thyristor 3B' exactly as the voltage of phase A becomes equal to the voltage of phase B. As the a-c line voltages continue to change, adequate voltage, up to full a-c line-to-line voltage, is available to change rapidly the direction of the current in the winding 2F and thus bring the current in the thyristor 2A' to zero and the thyristor 2A' to a non-conducting state. In a similar manner, the a-c line voltage causes thyristor 6A to conduct, reverses the current in the winding 5F and switches off thyristor 5C.

It is evident from the discussion that there are two delay times in switching the current from one node to the next. First is the time for the thyristor voltage to reverse, which can be up to one-third of a line cycle. Second is the time for current reversal in the individual coils as determined by the inductance and the line voltage. The first delay limits the motor speed to a speed below the synchronous speed based on line frequency and motor poles. The influence of the delay can be minimized by shifting the brushes at high speed in anticipation of a one-sixth cycle average delay time. The second delay further reduces the maximum motor speed, but can be minimized by reducing the self inductance of the individual coils when in the position for switching, e.g., by salient poles in a machine with an iron core or by use of air-gap windings in a superconducting machine.

As is illustrated in the partially cut-away isometric representation of FIG. 4C, the conductive segmented elements 10, 11, 13, 15 and 17 are in form at least each similar to the commutator of a d-c motor and the conductive rings 12, 14 and 16 are similar to slip rings of a wound rotor a-c motor. In this use, both the segmented rings and the solid rings are stationary rather than rotating. The active contact surfaces are on the inside of the rings rather than on the outside. The brushes 20, 21, 22 and 23 rotate and are carried on an extension 51 of the rotor shaft 52. The brushes can be of the conventional type of carbon material and require no electrical connections since the brushes simply connect adjacent conductive members. The elements 10, 11 etc., and the rings 12 etc., have the same major diameters, as shown.

In this use the logic switch 105 carries only the gate currents for the switching thyristors. Thus, the currents to be mechanically switched are smaller than the terminal currents of the motor by a factor of more than a thousand. At these low current levels the mechanical switching does not limit the maximum power of the motor as in conventionally commutated motors.

The sequence of activation of the switching devices 1D...6D for in current and for out current is determined by the mechanical motion of the brushes as shown in FIG. 3. Each time the brushes leave one set of segments and contact the next set, the switching device connected to the forward set goes from not active to active and the leaving set goes from active to not active. The switching device which is in-active is always separated 180 electrical degrees from the switching device which is out-active. The activation sequence corresponding to FIG. 2, 3, and 4 is given in Table 1.

TABLE I

| Degrees | In-Active | | Out-Active | |
|---|---|---|---|---|
| Rotor Rotation | Switching Device in-Active | Thyristors with Gates Connected to Line | Switching Device Out-Active | Thyristors with Gates Connected to Winding Nodes |
| 0 | 5D | 5A, 5B, 5C | 2D | 2A', 2B', 2C' |
| 60 | 6D | 6A, 6B, 6C | 3D | 3A', 3B', 3C' |
| 120 | 1D | 1A, 1B, 1C | 4D | 4A', 4B', 4C' |

TABLE I-Continued

| Degrees | In-Active | | Out-Active | |
|---|---|---|---|---|
| Rotor Rotation | Switching Device in-Active | Thyristors with Gates Connected to Line | Switching Device Out-Active | Thyristors with Gates Connected to Winding Nodes |
| 180 | 2D | 2A, 2B, 2C | 5D | 5A', 5B', 5C' |
| 240 | 3D | 3A, 3B, 3C | 6D | 6A', 6B', 6C' |
| 300 | 4D | 4A, 4B, 4C | 1D | 1A', 1B', 1C' |
| 360 60 | 5D | 5A, 5B, 5C | 2D | 2A', 2B', 2C' |

Figure 5:
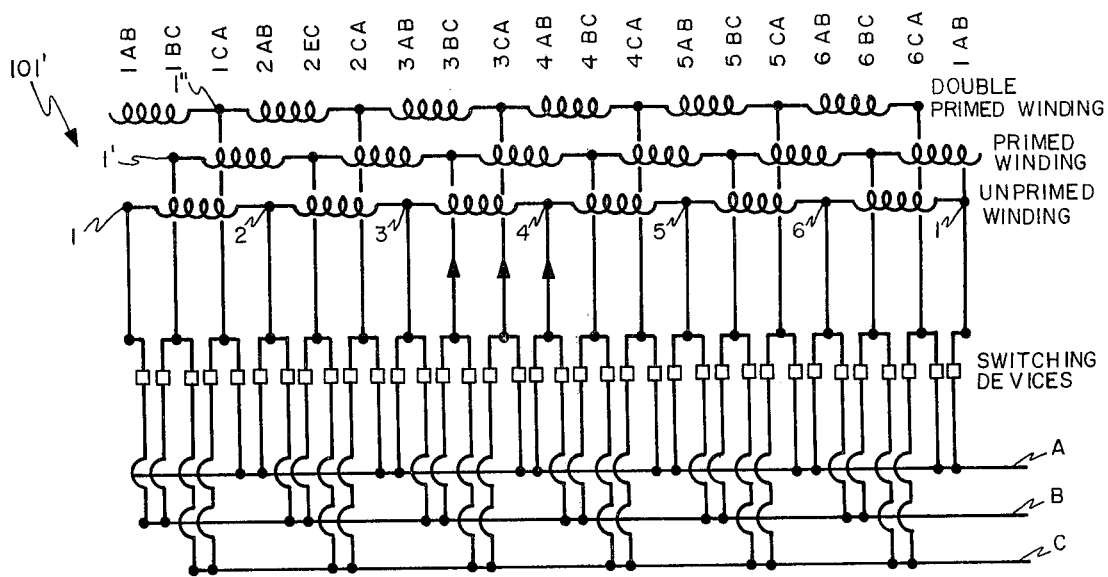
FIG. 5 shows schematically a modification of the motor of FIGS. 1 and 2 in that the motor of FIG. 5 contains three independent armature windings mechanically staggered by one-third of a coil width.
Figure 6:
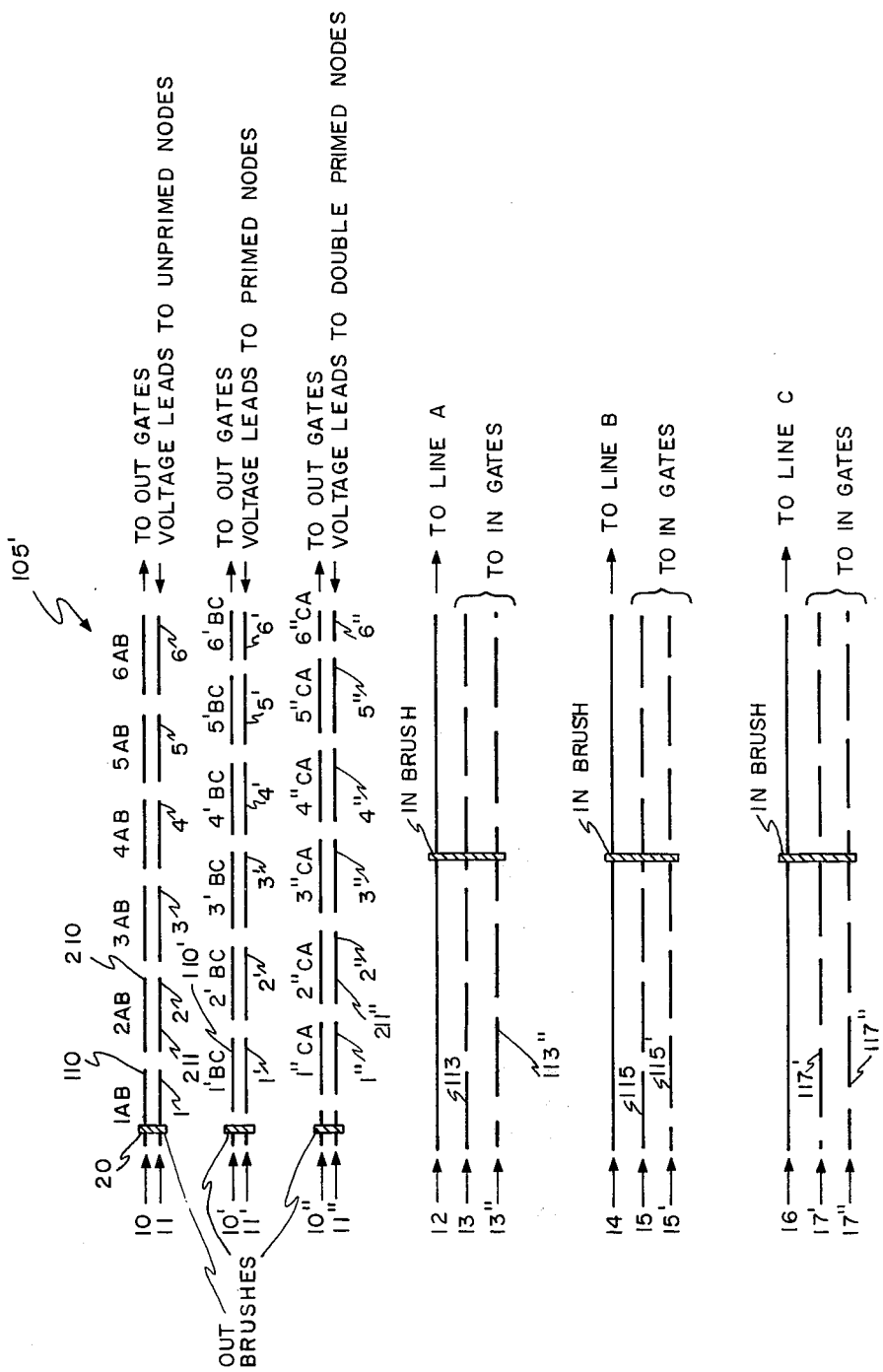
FIG. 6 shows schematically a mechanical logic processor that performs for the three-winding motor of FIG. 5 the same function as does the processor FIG. 3 for the single-winding motor of FIG. 2.

The motor labeled 101' in FIG. 5 has an armature consisting of three single phase windings, like the armature-winding 103, but mechanically staggered from one another by (1/Nth) of a coil width, where N (as above-noted) is the number of phases of the power system, here three. The three windings are designated unprimed, primed and double primed. The unprimed winding is connected between lines A and B, the primed winding between B and C and the double primed winding between C and A. These are eighteen switching units, each consisting of two thyristor pairs and the logical switching of the gate signals is done by a mechanical logic element 105' in FIG. 6. Conceptually the logic element 105' is like the logic element 105. The representation in FIG. 6 is essentially a logic diagram as well as a schematic representation of the geometry of the logic element 105'. In FIG. 5 the nodes of the unprimed winding are designated 1...6, like the nodes of the armature-winding 103 in FIG. 1. The first nodes 1' and 1'' only of the other two windings making up the armature of the machine 101' are labeled in the figure since it is believed that further numerals would merely confuse. The switching devices of the 18 needed for this embodiment are designated 1AB, 1BC, 1CA, 2AB, etc., at the top of FIG. 5. Turning again to FIG. 6, the upper conductive segmented elements are again numbered 10 and 11 and the brush 20. Gate signals pass from the nodes 1...6 through the segment and brush combination to the out thyristors 1AB, 2AB etc., as the brush 20 moves from left to right in the figure. Similar remarks apply to the other two segmented elements in the top of FIG. 6 except it will be noted that the segments associated with the 1', etc., and 1'' etc., nodes are staggered one-third coil length as above noted. Similar remarks apply to the segmented elements in the lower three combinations of the figure, which switch gate signals to the inthyristors of each switching device. Thus, the segments labeled 113 and 113'' are staggered one-third coil length from one another, as are segments 115 and 115', 117' and 117''. The further segments in each group are not labeled but are similarly staggered. The system of FIGS. 5 and 6 provides eighteen steps in field rotation with 36 thyristor pairs, thereby giving more uniform rotor torque than is obtainable in the motor of FIGS. 1–4. To provide this same uniformity in a single winding arrangement like that of FIGS. 1–4 would require 54 thyristor pairs. The system of FIGS. 5 and 6 also provides larger back bias voltages to insure that a thyristor will switch OFF when the gate signal is removed in logical sequencing by the logic element 105'.

The motor armature-winding shown at 103A in FIG. 7 (B) is similar to the armature-winding 103 except that the winding 103A have 18 coils, not six, and the logic element shown at 105'' comprises conductive members 10A, 11A, etc., that correspond in principle to the conductive members 10, 11 etc., in FIG. 3. But in FIG. 7(C), in addition to the brushes 20, 21, 22 and 23 there are associated brushes 20', 21', 22' and 23', respectively; the brush pairs 20-20', 21-21', etc., perform as pairs the function of the individual brushes 20, 21, etc. in the previously discussed systems. In the system of FIG. 7(A), (B) and (C), the speed of the machine 105'' can be changed by simultaneously changing the relative angular position of the associated brushes. The unbroken line representations of the brushes wherein the primed brush and the corresponding unprimed brush are separated the most in FIG. 7(C) represent a condition of maximum speed and the broken line representations wherein the corresponding brushes are close together represent a condition of minimum speed for a fixed line voltage and field current. The current in the armature winding 103A in these two situations is shown in FIG. 7(A). The in thyristors in this embodiment carry current in to the motor to a pair of winding nodes separated from one another by one or more coils and the out thyristors carry current out from a pair of nodes (separated from one another the same amount as the first pair) separated 180 electrical degrees from the respective in nodes. The effect of this arrangement is to provide currentcarrying coils and non-current-carrying coils as diagrammed in FIG. 7A. The speed of the motor is related to the ratio of the time average extent of the current-carrying coil groups and the non-current-carrying coil groups and the speed is changed by said ratio (the field and line voltage being constant) in the exemplary configuration by moving the brush pairs 20–20, 21–21', etc., toward or away from one another.

One use contemplated for motors of the type herein discussed is for variable-speed ship drives. To give perspective, the size of such motors would be the order of 21,000 horsepower and they would have a superconducting field winding. For details of superconducting structures, reference may be made to U.S. Pat. No. 3,742,265 of the present inventor, as well as the prior art cited by the Office and made of record by the patentee in that patent. In a ship drive scheme, the a-c supply 102, as is well known, would be an alternator driven by a gas or steam turbine. The voltage output of such a system is controllable. Other systems can employ different schemes for voltage control to the input of the machine 101 depending upon circumstances. Also, systems other than three-phase can be employed with armatures having other than six coils. The mechanical logic device need not employ sliding switches attached to the machine shaft. The motion of the shaft may affect the sequential switching by magnetic or optical means without contact; however, the logic system 105 can employ magnetic sensors, or light sensors or reed switches and the like to provide the sensing function.

Further modifications of the invention will occur to persons skilled in the art and all such modifications are deemed to be within the spirit and scope of the invention as defined by the appended claims.

What is claimed is:

1. A superconducting motor adapted to connect to an N-phase polyphase a-c power system that comprises, in combination: an armature winding having coils connected in a closed-loop configuration; an M-pole superconducting field electromagnetically coupled to the armature winding; switch means comprising N-pairs of switching devices connected to each armature winding node, one device of the pair being adapted to conduct electric current in to each node of the armature winding and the other device of each pair being adapted to conduct electric current out from each node of the armature winding, each swinging-device pair comprising two thyristors connected in an anti-parallel emitter-to-base configuration; and sensing and logic means connected to determine, in part, the switching times of the switching devices, the switching devices being a function, as well, of the instantaneous voltage of the a-c system, switching being timed to cause the armature magnetic axis to lead the field magnetic axis by about 90 electrical degrees thereby to provide a motor that operates directly from an a-c line yet exhibits the speed control characteristic of a separately excited d-c motor, said sensing means comprising position indicator and logic device means connected to control gate signals to the thyristors and to relate gate signals to the relative angular positions of the two magnetic axes, the gate signal to one thyristor of each pair being derived from a line of the polyphase a-c power system and the gate signal to the other thyristor of the same pair being derived for a winding node.

2. Apparatus as claimed in claim 1 in which N equals three, in which there are three thyristor pairs connected to each node, and in which the armature comprises at least six coils and, therefore, at least six nodes.

3. Apparatus as claimed in claim 1 in which the field is on the rotor of the machine and in which the sensing and logic means comprises mechanical position indicator and logic device means connected to control the introduction of gate signals to the thyristors and to relate said introduction to the angular position of the rotor.

4. Apparatus as claimed in claim 3 in which the mechanical position indicator and logic device means comprises a mechanical logic unit that logically effects switching so as to effect an approximately 90 electrical degree spread between the magnetic axis of the armature and the magnetic axis of the rotor field.

5. Apparatus as claimed in claim 4 in which the mechanical logic unit comprises logic elements connected to said nodes, further logic elements connected to the gates of the out thyristors, still further logic elements connected to the lines of the polyphase system, and still other elements connected to the gates of the in-thyristors.

6. Apparatus as claimed in claim 5 in which the logic unit comprises a first conductive element comprising conductive segments equal in number to the number of nodes of the armature and a second conductive element like said first conductive element.

7. Apparatus as claimed in claim 6 in which the first conductive element and the second conductive elements are annular in shape and are closely, coaxially spaced from one another and in which a brush bridges the gap between the first conductive element and the second conductive element.

8. Apparatus as claimed in claim 7 in which the segments of the first conductive element are each connected to gates of the out-thyristors associated with one node of the armature and in which the segments of the second conductive element are each connected to one node, a conductive path from said one node and the gates of the out-thyristors associated with said one node being provided through said brush in a predetermined fashion as the shaft rotates to maintain said 90 electrical degree spread.

9. Apparatus as claimed in claim 8 that also includes N pairs of additional annular-shaped, conductive elements that function in pairs, one element of each pair of additional elements being a solid ring conductor that is connected to each of the N line phases and the other element of each pair of additional elements comprising a plurality of conductive segments disposed in the form of an annulus and whose number equals the number of nodes in the armature winding, the segments of each pair of additional elements being connected to the gates of the in-thyristors of one thyristor pair associated with each node, the elements of each pair of additional elements being closely axially spaced from one another, the apparatus including a brush associated with each pair of additional elements and bridging the gap therebetween thereby to provide a conductive path between a line phase and the gates of the in-thyristor associated with the particular winding node.

10. Apparatus as claimed in claim 9 in which the first named brush and each of the second-named brushes is replaced by a pair of brushes, each pair performing the function of the individual brush replaced, each brush of each pair being mechanically displaced from one another and being novable simultaneously toward or away from one another to effect changes in the speed of the motor.

11. Apparatus as claimed in claim 1 in which the field is on the rotor and in which the sensing and logic means acts to render active devices of the switch means operable to carry current in to a pair of nodes separated from one another by one or more coils and to render active devices of the switch means operable to carry current out from a pair of nodes separated 180 electrical degrees from the respective in nodes, thereby to separate the armature into current-carrying coil groups and non-current-carrying coil groups and to affect the speed of the motor on the basis of the ratio of the time average extent of the current-carrying coil groups and the non-current-carrying coil groups.

12. Apparatus as claimed in claim 11 in which the sensing and logic means is adjustable so as to vary the ratio of the time average extent of the current-carrying groups and the non-current-carrying groups to permit variation in motor speed.

13. Apparatus as claimed in claim 12 in which the field is on the rotor of the machine, and in which the sensing and logic means comprises mechanical position indicator and logic device means connected to control the introduction of gate signals to the thyristors and to relate to the angular position of the rotor.

14. Apparatus as claimed in claim 13 in which the mechanical position indicator comprises logic elements connected to said nodes, further logic elements connected to the gates of the out-thyristors, still further logic elements connected to the lines of the polyphase system, and still other elements connected to the gates of the in-thyristors, the first-hand logic elements, said further logic elements and the said still other logic elements each comprising conductive segments equal in number to the number of nodes in the winding and disposed in an annular configuration, and said still further logic elements comprising conductive rings.

15. Apparatus as claimed in claim 14 having three of said still further logic elements and one of said still other elements associated with each of the three, all of the annular-shaped logic elements units being coaxial and separated slightly from one another to operate in pairs, each pair of units having associated therewith two pairs of brushes bridging the associated pair and movable angularly with respect to one another to vary the motor speed.

16. A variable-speed rotary electric machine for connection to an N-phase polyphase power system that comprises, in combination: an armature winding having an even number of coils connected in a closed-loop configuration; an M-pole field electromagnetically coupled to the armature winding; switch means comprising N-pairs of thyristors connected to each armature winding node, one thyristor of each pair of conducting electric current to each armature winding node and the other thyristor of each pair conducting electric current away from each armature winding node; and sensing and logic means connected to determine, in part, the state of conduction of the thyristor pairs, thereby to determine the direction of electric current flow in each of the armature coils, said sensing means comprising angular position indicator and logic device means connected to control gate signals to the thyristors and to relate said gate signals to the relative angular positions of the magnetic fields of the armature and the M-pole field, the gate of one thyristor of each pair being adapted to connect to an incoming line of the polyphase power system to derive a gate signal from said incoming line and the gate of the other thyristor of the same pair being connected to its associated armature winding node to derive a gate signal from said associated winding node.

17. Apparatus as claimed in claim 16 in which the field is an M-pole salient-pole field.

18. A superconducting motor adapted to connect to an N-phase polyphase a-c power system that comprises, in combination: an armature comprising N single-phase windings each having coils connected in a closed-loop configuration and mechanically staggered from one another by 1/N of a coil width; an M-pole d-c field electromagnetically coupled to the N armature windings; switch means comprising N-pairs of switching devices connected to each armature winding node, one device of the pair acting to conduct electric currents into each node of the armature winding and the other device of each pair acting to conduct electric current out from each node of the armature winding; and sensing means connected to determine, in part, the state of conduction of the switch-device pairs to determine the direction of electric current in each of the coils of the N single-phase windings, the switching times being a function, as well, of the instantaneous voltage of the a-c system.

* * * * *